(12) United States Patent
Furui et al.

(10) Patent No.: US 12,087,224 B2
(45) Date of Patent: Sep. 10, 2024

(54) ELECTRONIC DEVICE FOR REDUCING OUTPUT VARIATION FACTORS OF PIXEL CIRCUITS

(71) Applicant: Innolux Corporation, Miao-Li County (TW)

(72) Inventors: Yuko Furui, Miao-Li County (TW); Akihiro Iwatsu, Miao-Li County (TW); Shuji Hagino, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/942,185

(22) Filed: Sep. 12, 2022

(65) Prior Publication Data

US 2024/0087517 A1    Mar. 14, 2024

(51) Int. Cl.
*G09G 3/3233* (2016.01)
*G06K 7/10* (2006.01)

(52) U.S. Cl.
CPC ....... *G09G 3/3233* (2013.01); *G06K 7/10722* (2013.01); *G09G 2310/0291* (2013.01); *G09G 2310/0297* (2013.01); *G09G 2310/08* (2013.01); *G09G 2320/0233* (2013.01); *G09G 2360/14* (2013.01)

(58) Field of Classification Search
CPC ......... G09G 3/3233; G09G 2310/0291; G09G 2310/0297; G09G 2310/08; G09G 2320/0233; G09G 2360/14
See application file for complete search history.

(56) References Cited

U.S. PATENT DOCUMENTS

| 6,587,142 | B1 | 7/2003 | Kozlowski et al. | |
|---|---|---|---|---|
| 2005/0007460 | A1* | 1/2005 | Stavely | H04N 25/533 348/222.1 |
| 2009/0147118 | A1* | 6/2009 | Karim | H04N 25/76 348/E5.091 |
| 2011/0234871 | A1* | 9/2011 | Taruki | H04N 25/709 348/297 |

FOREIGN PATENT DOCUMENTS

CN    107426513    11/2019

* cited by examiner

*Primary Examiner* — Stephen G Sherman
(74) *Attorney, Agent, or Firm* — JCIPRNET

(57) ABSTRACT

An electronic device including a plurality of sensing pixel circuits is provided. At least one of the sensing pixel circuits includes a photoelectric sensing element, a first transistor device, a second transistor device, a third transistor device and a fourth transistor device. The fourth transistor device includes a first end, a second end and a control end. The first end of the fourth transistor device is coupled to a first end of the first transistor device. The second end of the fourth transistor device is coupled to a bias voltage. The control end of the fourth transistor device is coupled to a scan line. The fourth transistor device serves as a current sink in a pre-trap period.

7 Claims, 16 Drawing Sheets

ELECTRONIC DEVICE FOR REDUCING OUTPUT VARIATION FACTORS OF PIXEL CIRCUITS

BACKGROUND

Technical Field

The disclosure generally relates to an electronic device, and more particularly to an electronic device including a plurality of pixel circuits that have a stable output with low noises.

Description of Related Art

A complete sensing cycle of image sensors includes actions such as reset, exposure, and readout. In a voltage mode that is one of a driving mode for the image sensors with active pixel array design, pixel circuits are reset before sensing lights. Photoelectric sensing elements of the pixel circuits are exposed to sense lights and generate photodiode currents in response to incident lights. Next, the photodiode currents are converted into sensing data to be outputted to a circuit of next stage. However, outputs of the pixel circuits may be connected to some circuits, and the connected circuits will affect the sensing data outputted from the pixel circuits. Therefore, how to reduce output variation factors of the pixel circuits in electronic devices is one of the research and development focuses of those skilled in the art.

SUMMARY

The disclosure is directed to an electronic device, that the output variation factors of the pixel circuits can be reduced, and the pixel circuits have a stable output with low noises.

An electronic device including a plurality of sensing pixel circuits is provided. At least one of the sensing pixel circuits includes a photoelectric sensing element, a first transistor device, a second transistor device, a third transistor device and a fourth transistor device. The photoelectric sensing element includes a first end and a second end. The second end of the photoelectric sensing element is coupled to a bias voltage. The first transistor device includes a first end, a second end and a control end. The control end of the first transistor device is coupled to a first scan line. The second transistor device includes a first end, a second end and a control end. The first end of the second transistor device is coupled to an operation voltage. The second end of the second transistor device is coupled to the first end of the first transistor device. The control end of the second transistor device is coupled to the first end of the photoelectric sensing element. The third transistor device includes a first end, a second end and a control end. The first end of the third transistor device is coupled to a reset voltage. The second end of the third transistor device is coupled to the first end of the photoelectric sensing element. The control end of the third transistor device is coupled to a reset line. The fourth transistor device includes a first end, a second end and a control end. The first end of the fourth transistor device is coupled to the first end of the first transistor device. The second end of the fourth transistor device is coupled to the bias voltage. The control end of the fourth transistor device is coupled to a second scan line.

An electronic device including a plurality of sensing pixel circuits and a plurality of pre-trap transistor devices is provided. At least one of the sensing pixel circuits includes a photoelectric sensing element, a first transistor device, a second transistor device and a third transistor device. The photoelectric sensing element includes a first end and a second end. The second end of the photoelectric sensing element is coupled to a bias voltage. The first transistor device includes a first end, a second end and a control end. The control end of the first transistor device is coupled to a first scan line. The second transistor device includes a first end, a second end and a control end. The first end of the second transistor device is coupled to a first operation voltage. The second end of the second transistor device is coupled to the first end of the first transistor device. The control end of the second transistor device is coupled to the first end of the photoelectric sensing element. The third transistor device includes a first end, a second end and a control end. The first end of the third transistor device is coupled to a reset voltage. The second end of the third transistor device is coupled to the first end of the photoelectric sensing element. The control end of the third transistor device is coupled to a reset line. At least one of the pre-trap transistor devices is coupled to the at least one sensing pixel circuit and includes a first end, a second end and a control end. The first end of the pre-trap transistor device is coupled to the second end of the first transistor device. The second end of the pre-trap transistor device is coupled to a second operation voltage. The control end of the pre-trap transistor device is coupled to a control signal.

An electronic device including a plurality of sensing pixel circuits is provided. At least one of the sensing pixel circuits includes a photoelectric sensing element, a first transistor device, a second transistor device and a third transistor device. The photoelectric sensing element includes a first end and a second end. The second end of the photoelectric sensing element is coupled to a bias voltage. The first transistor device includes a first end, a second end and a control end. The second end of the first transistor device is coupled to a data line. The control end of the first transistor device is coupled to a first scan line, and a read signal is transmitted on the first scan line to control a conduction state of the first transistor device. The read signal includes a first period and a second period. The read signal turns on the first transistor device during the first period and the second period. A data voltage of the data line is at a first level during the first period, and the data voltage of the data line is at a second level during the second period. The second transistor device includes a first end, a second end and a control end. The first end of the second transistor device is coupled to a first operation voltage. The second end of the second transistor device is coupled to the first end of the first transistor device. The control end of the second transistor device is coupled to the first end of the photoelectric sensing element. The third transistor device includes a first end, a second end and a control end. The first end of the third transistor device is coupled to a reset voltage. The second end of the third transistor device is coupled to the first end of the photoelectric sensing element. The control end of the third transistor device is coupled to a reset line.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
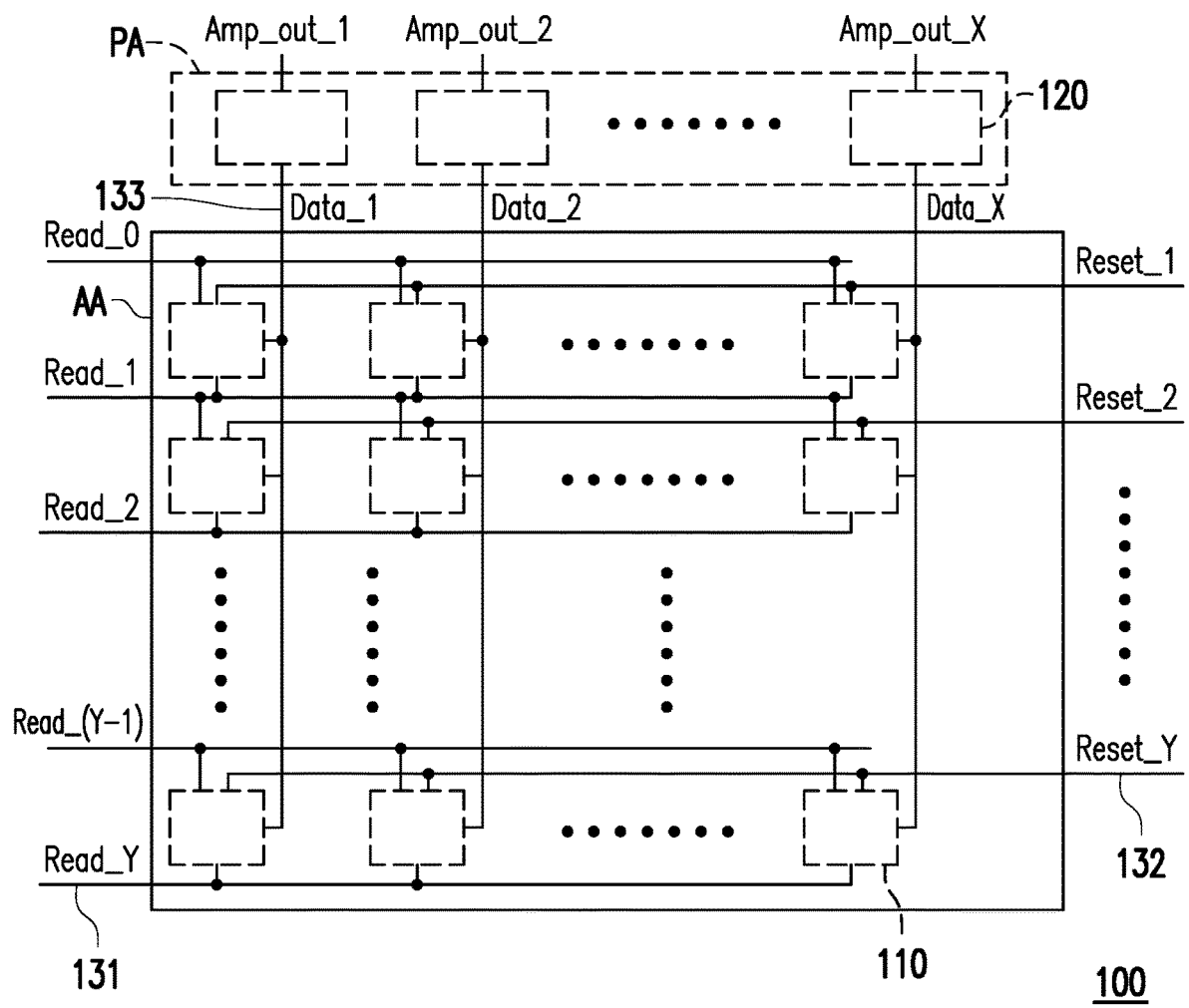
FIG. 1A illustrates a schematic diagram of an electronic device according to an embodiment of the disclosure.

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

In a disclosure, the embodiments use "pixel" or "pixel unit" as a unit for describing a specific region including at least one functional circuit for at least one specific function. Describing "pixel with circuit" as "circuit" is available for a disclosure. For example, a "pixel with current source" may be described as a "current source", or a "pixel with current sink" may be described as a "current sink". The region of a "pixel" is depended on a unit for providing a specific function, adjacent pixels may share the same parts or wires, but may also include its own specific parts therein. For example, adjacent pixels may share a same scan line or a same data line, but the pixels may also have their own transistors or capacitance.

In a disclosure, a current source circuit is a circuit unit for outputting current, and a current sink is a circuit unit for draining current. The adjacent circuit units may share the same parts or wires and may also include its specific parts therein.

It should be noted that the technical features in different embodiments described in the following can be replaced, recombined, or mixed with one another to constitute another embodiment without departing from the spirit of a disclosure.

FIG. 1A illustrates a schematic diagram of an electronic device according to an embodiment of the disclosure. Referring to FIG. 1A, the electronic device 100 of the present embodiment includes a plurality of sensing pixel circuits 110 and a plurality of amplifier circuits 120. The electronic device 100 has an active area AA and a peripheral area PA. The sensing pixel circuits 110 are disposed in the active area AA, and the amplifier circuits 120 are disposed in the peripheral area PA. The sensing pixel circuits 110 are arranged in an array, and the amplifier circuits 120 are disposed on respective pixel columns.

The electronic device 100 further includes a plurality of scan lines 131, a plurality of reset lines 132, and a plurality of data lines 133. The scan lines 131 and the reset lines 132 are connected to the sensing pixel circuits 110, and the data lines 133 are connected to the sensing pixel circuits 110 and the amplifier circuits 120. The number of scan lines 131 is larger than the number of the reset lines 132, as illustrated in FIG. 1A.

The reset lines 132 transmit reset signals Reset_1 and Reset_2 to Reset_Y to the respective pixel rows. The reset signals Reset_1 and Reset_2 to Reset_Y reset the respective pixel rows during a reset period.

The scan lines 131 transmit read signals Read_0, Read_1, Read_2 to Read_(Y−1), and Read_Y to respective pixel rows, where Y is an integer larger than or equal to 4. The read signals Read_1, Read_2 to Read_(Y−1), and Read_Y drive the respective pixel rows to output the sensing data Data_1 and Data_2 to Data_X to the amplifier circuits 120 during a readout period, where X is an integer larger than or equal to 3.

The data lines 133 transmit sensing data Data_1 and Data_2 to Data_X from the sensing pixel circuits 110 to the amplifier circuits 120 during the readout period. The amplifier circuits 120 is coupled to the data lines 133. The amplifier circuits 120 process, e.g. a signal amplification operation, the sensing data Data_1 and Data_2 to Data_X and output amplified sensing data Amp_out_1 and Amp_out_2 to Amp_out_X.

Figure 1B:
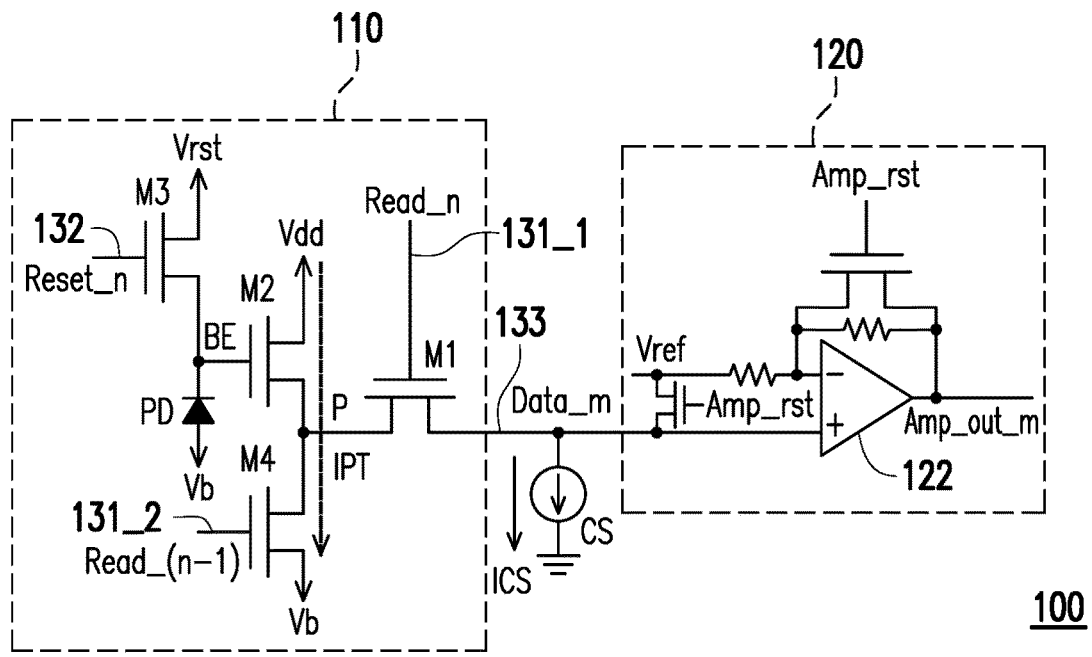
FIG. 1B illustrates a schematic diagram of the sensing pixel circuit and the amplifier circuit of FIG. 1A according to an embodiment of the disclosure.

FIG. 1B illustrates a schematic diagram of the sensing pixel circuit and the amplifier circuit of FIG. 1A according to an embodiment of the disclosure. Referring to FIG. 1A and FIG. 1B, one of the sensing pixel circuits 110 is coupled to one of the amplifier circuits 120 via one of the data lines 133. Each of the data lines 133 has a current source CS, and the current source CS is disposed outside of the active area AA to supply a constant current ICS. To be specific, the electronic device 100 further includes the plurality of current sources CS. One of the current source CS is coupled to the amplifier circuit 120 and the sensing pixel circuit 110. The current source CS is, for example, disposed in the peripheral area PA.

To be specific, the sensing pixel circuit 110 includes a photoelectric sensing element PD, a first transistor device M1, a second transistor device M2, a third transistor device M3 and a fourth transistor device M4. The photoelectric sensing element PD includes a first end (cathode) and a second end (anode). The first end of the photoelectric sensing element PD serves as a node BE, and is coupled to the second transistor device M2 and the third transistor device M3. The second end of the photoelectric sensing element PD is coupled to a bias voltage Vb.

The first transistor device M1 includes a first end, a second end and a control end. The first end of the first transistor device M1 is coupled to the fourth transistor device M4. The second end of the first transistor device M1 is coupled to the amplifier circuit 120. The control end of the first transistor device M1 is coupled to a first scan line 131_1 of the scan lines 131.

The second transistor device M2 includes a first end, a second end and a control end. The first end of the second transistor device M2 is coupled to an operation voltage Vdd. In an embodiment, the operation voltage Vdd may be a system voltage and larger than the bias voltage Vb. The second end of the second transistor device M2 serves as a node P, and is coupled to the first end of the first transistor device M1. The control end of the second transistor device M2 is coupled to the first end of the photoelectric sensing element PD.

The third transistor device M3 includes a first end, a second end and a control end. The first end of the third transistor device M3 is coupled to a reset voltage Vrst. In an embodiment, the operation voltage Vdd may be larger than or equal to the reset voltage Vrst. The second end of the third transistor device M3 is coupled to the first end of the photoelectric sensing element PD. The control end of the third transistor device M3 is coupled to the reset line 132.

The fourth transistor device M4 includes a first end, a second end and a control end. The first end of the fourth transistor device M4 is coupled to the first end of the first transistor device M1. The second end of the fourth transistor device M4 is coupled to the bias voltage Vb. The control end of the fourth transistor device M4 is coupled to a second scan line 131_2 of the scan lines 131. In the present embodiment, the fourth transistor device M4 is disposed in the sensing pixel circuit 110 and serves as a current sink. In addition, the second scan line 131_2 is coupled to a specified pixel row of the sensing pixel circuits 110, and the first scan line 131_1 is coupled to a pixel row of the sensing pixel circuits 110 next to the specified pixel row.

The control end of the first transistor device M1 receives a first read signal Read_n of the read signals Read_1, Read_2 to Read_(Y−1), and Read_Y, and a conduction state of the first transistor device M1 is controlled by the first read signal Read_n, where n is an integer, and n=1~Y. The first read signal Read_n is transmitted on the first scan line 131_1. The control end of the fourth transistor device M4 receives a second read signal Read_(n−1) of the read signals Read_0, Read_1, Read_2 to Read_(Y−1), and a conduction state of the fourth transistor device M4 is controlled by the second read signal Read_(n−1). The second read signal Read_(n−1) is transmitted on the second scan line 131_2.

The amplifier circuit 120 is coupled to the second end of the first transistor device M1 via the data line 133. The amplifier circuit 120 includes an amplifier 122. The amplifier 122 includes a first input end, a second input end, and an output end. The first input end of the amplifier 122 receives sensing data Data_m of the sensing data Data_1 and Data_2 to Data_X, and the second input end of the amplifier circuit 120 receives a reference signal Vref, where m is an integer, and m=1~X. The amplifier circuit 120 is controlled by a control signal Amp_rst to perform the signal amplification operation on the received sensing data Data_m and thus output an amplified sensing data Amp_out_m of the amplified sensing data Amp_out_1 and Amp_out_2 to Amp_out_X via the output end.

Figure 1C:
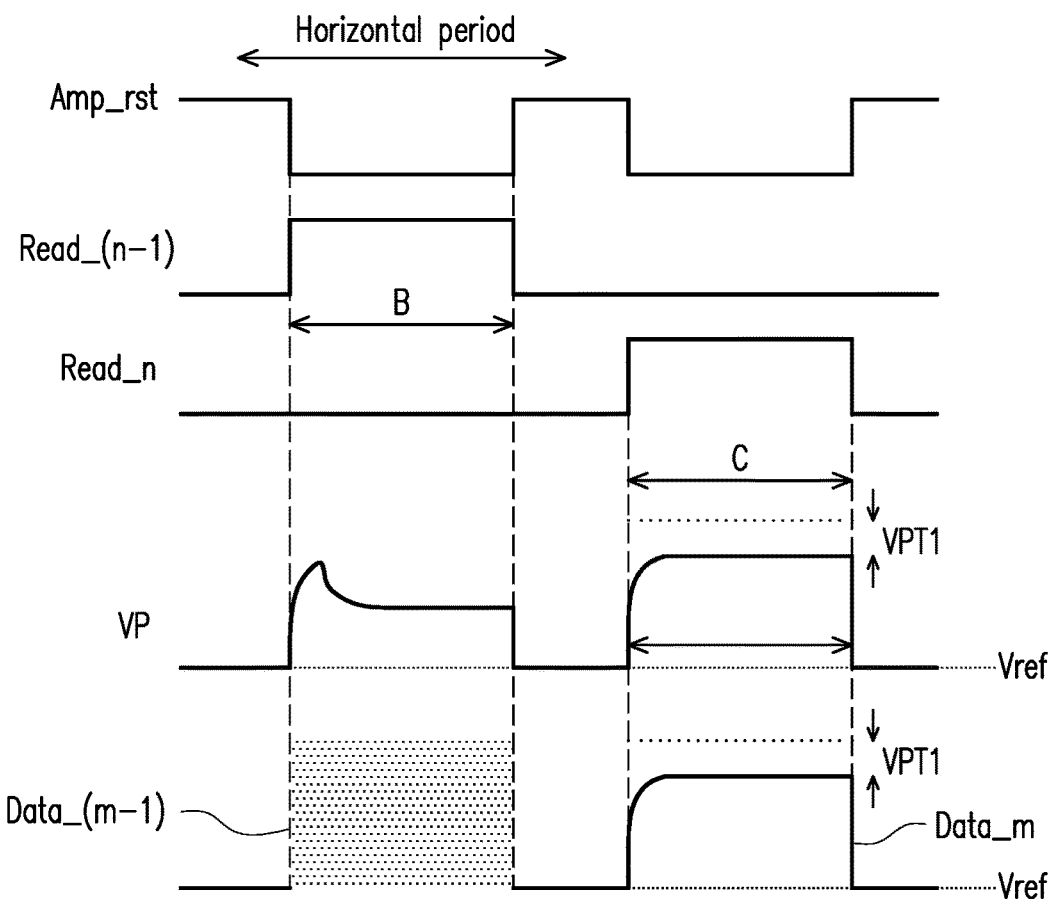
FIG. 1C illustrates a waveform diagram of signals of the sensing pixel circuit and the amplifier circuit of FIG. 1B according to an embodiment of the disclosure.

FIG. 1C illustrates a waveform diagram of signals of the sensing pixel circuit and the amplifier circuit of FIG. 1B according to an embodiment of the disclosure. Referring to FIG. 1B and FIG. 1C, a voltage signal VP indicates the voltage at the node P, a sensing data Data (m−1) indicates the sensing data from the sensing pixel circuit 110 scanned by the second read signal Read_(n−1), and the sensing data Data_m indicates the sensing data from the sensing pixel circuit 110 scanned by the first read signal Read_n.

In a period B, the second read signal Read_(n−1) is at a high level to turn on the fourth transistor device M4, and the first read signal Read_n is at a low level to turn off the first transistor device M1. The period B can be deemed as a pre-trap period before a period C. A current IPT flows through the second transistor device M2 and the fourth transistor device M4 from the operation voltage Vdd to the bias voltage Vb. A value of the current IPT is determined according to an equivalent resistance of the second transistor device M2 and the fourth transistor device M4, and the current IPT may be larger than the constant current ICS supplied by the current source CS. The transitional phenomena of carrier conduction instability in the second transistor device M2 is accelerated by the current IPT in the period B, i.e. the pre-trap period.

In the period C, the first read signal Read_n is at the high level to turn on the first transistor device M1, and the second read signal Read_(n−1) is at the low level to turn off the fourth transistor device M4. The constant current ICS flows through the second transistor device M2 and the first transistor device M1 from the operation voltage Vdd to the current source CS. The second transistor device M2 acts as a source follower in a transistor saturation region including the phenomena saturated enough in the period B.

Therefore, a voltage difference VPT1 of the voltage signal VP and the sensing data Data_m is a fixed value to occur by the phenomena saturated, and does not change along with the current source CS and time, such that the output variation factor of the sensing pixel circuit 110, non-saturated phenomena on the sensing data Data_m can be reduced.

Figure 2A:
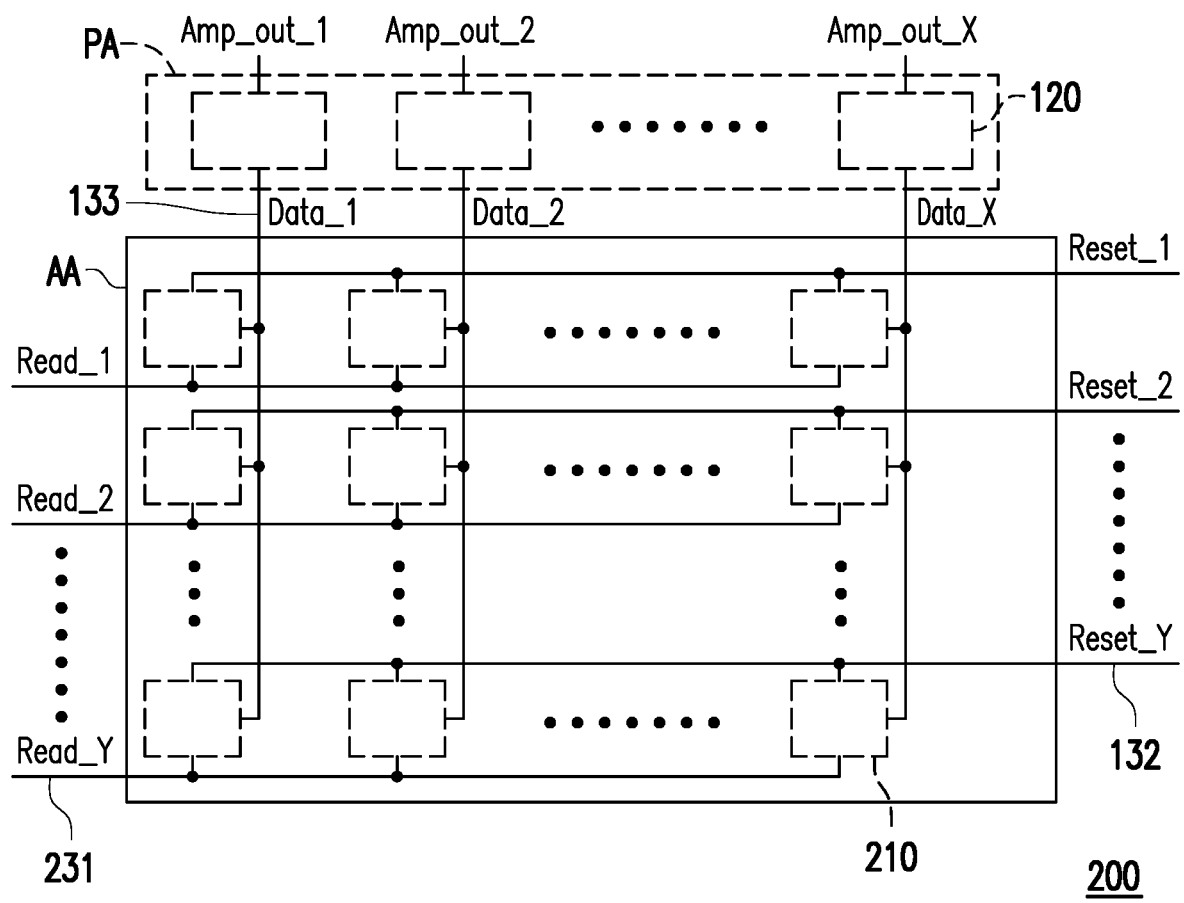
FIG. 2A illustrates a schematic diagram of an electronic device according to an embodiment of the disclosure.

FIG. 2A illustrates a schematic diagram of an electronic device according to an embodiment of the disclosure. Referring to FIG. 2A, the electronic device 200 of the present embodiment includes a plurality of sensing pixel circuits 210 and a plurality of amplifier circuits 120. The sensing pixel circuits 210 are disposed in the active area AA, and the amplifier circuits 120 are disposed in the peripheral area PA. The number of scan lines 231 is equal to the number of the reset lines 132, as illustrated in FIG. 2A. The scan lines 231 transmit the read signals Read_1, Read_2 to Read_Y to respective pixel rows.

Figure 2B:
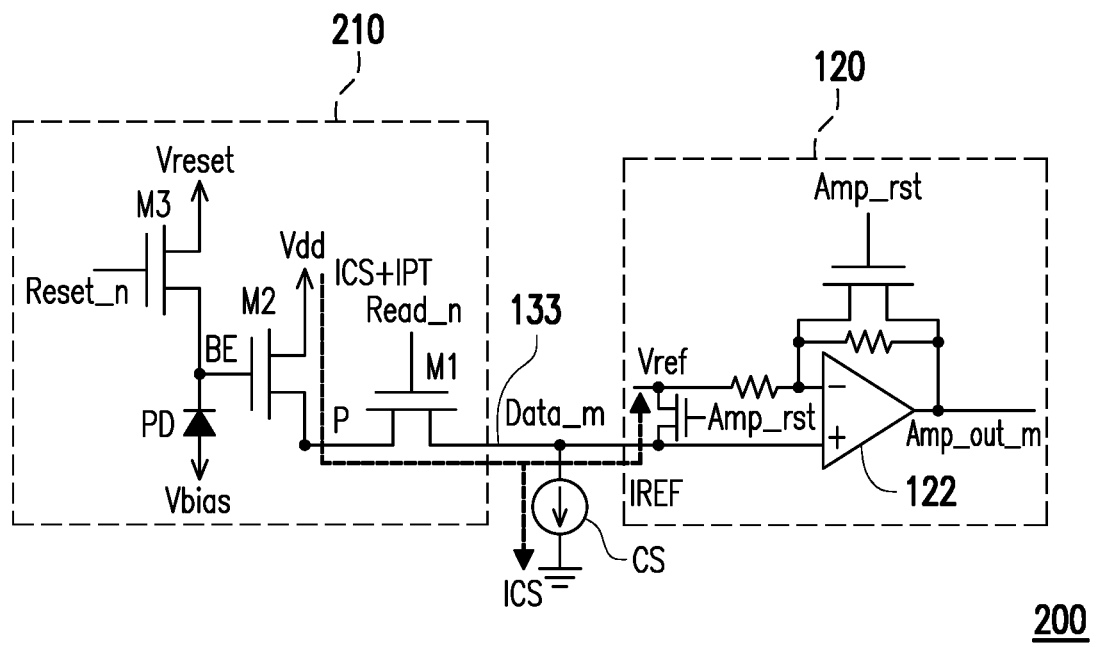
FIG. 2B illustrates a schematic diagram of the sensing pixel circuit and the amplifier circuit of FIG. 2A according to an embodiment of the disclosure.

FIG. 2B illustrates a schematic diagram of the sensing pixel circuit and the amplifier circuit of FIG. 2A according to an embodiment of the disclosure. Referring to FIG. 2A and FIG. 2B, the sensing pixel circuit 210 of the present embodiment includes a photoelectric sensing element PD, a first transistor device M1, a second transistor device M2 and a third transistor device M3. The photoelectric sensing element PD includes a first end (cathode) and a second end (anode). The first end of the photoelectric sensing element PD serves as a node BE, and is coupled to the second transistor device M2 and the third transistor device M3. The second end of the photoelectric sensing element PD is coupled to the bias voltage Vb.

The first transistor device M1 includes a first end, a second end and a control end. The first end of the first transistor device M1 is coupled to the second transistor device M2. The second end of the first transistor device M1 is coupled to the amplifier circuit 120 via the data line 133. The control end of the first transistor device M1 is coupled to a first scan line 231_1 of the scan lines 231. The read signal Read_n is transmitted on the first scan line 231_1 to control the conduction state of the first transistor device M1.

The second transistor device M2 includes a first end, a second end and a control end. The first end of the second transistor device M2 is coupled to the operation voltage Vdd. The second end of the second transistor device M2 is coupled to the first end of the first transistor device M1. The control end of the second transistor device M2 is coupled to the first end of the photoelectric sensing element PD.

The third transistor device M3 includes a first end, a second end and a control end. The first end of the third transistor device M3 is coupled to the reset voltage Vrst. The second end of the third transistor device M3 is coupled to the first end of the photoelectric sensing element PD. The control end of the third transistor device M3 is coupled to the reset line 132.

Figure 2C:
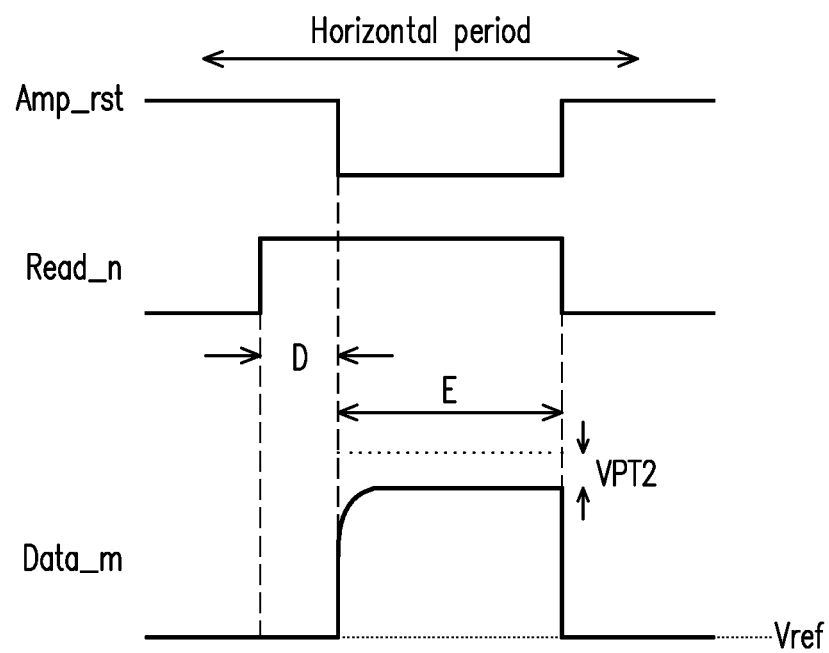
FIG. 2C illustrates a waveform diagram of signals of the sensing pixel circuit and the amplifier circuit of FIG. 2B according to an embodiment of the disclosure.

FIG. 2C illustrates a waveform diagram of signals of the sensing pixel circuit and the amplifier circuit of FIG. 2B according to an embodiment of the disclosure. Referring to FIG. 2B and FIG. 2C, the read signal Read_n includes a first period D and a second period E. The first period D and the second period E are a continuous period, and the second period E is longer than the first period D. The read signal Read_n turns on the first transistor device M1 during the first period D and the second period E. The sensing data Data_m (a data voltage of the data line 133) is at a first level, e.g. the reference signal Vref, during the first period D, and the sensing data Data_m is at a second level, e.g. a high level, during the second period E. The second level is higher than or equal to the first level Vref.

In the first period D, the first read signal Read_n is at the high level to turn on the first transistor device M1, and the control signal Amp_rst is also at the high level to turn on transistor devices of the amplifier circuit 120. The first period D can be deemed as the pre-trap period. The sensing data Data_m is at the low level, e.g. the first level Vref, during the first period D. A total current ICS+IREF flows through the second transistor device M2 and the first transistor device M1. Next, the constant current ICS flows to the current source CS, and the reference current IREF flows to the amplifier circuit 120. The transitional phenomena of carrier conduction instability in the second transistor device M2 is accelerated by the total current ICS+IREF in the first period D, i.e. the pre-trap period.

In the second period E, the first read signal Read_n is at the high level to turn on the first transistor device M1. The constant current ICS flows through the second transistor device M2 and the first transistor device M1 from the operation voltage Vdd to the current source CS. The second transistor device M2 acts as a source follower in the transistor saturation region including the phenomena saturated enough in the period D.

Therefore, a voltage difference VPT2 of the sensing data Data_m is a fixed value to occur by the phenomena saturated, and does not change along with the current source CS and time, such that the output variation factor of the sensing pixel circuit 210, non-saturated phenomena on the sensing data Data_m can be reduced.

Figure 3A:
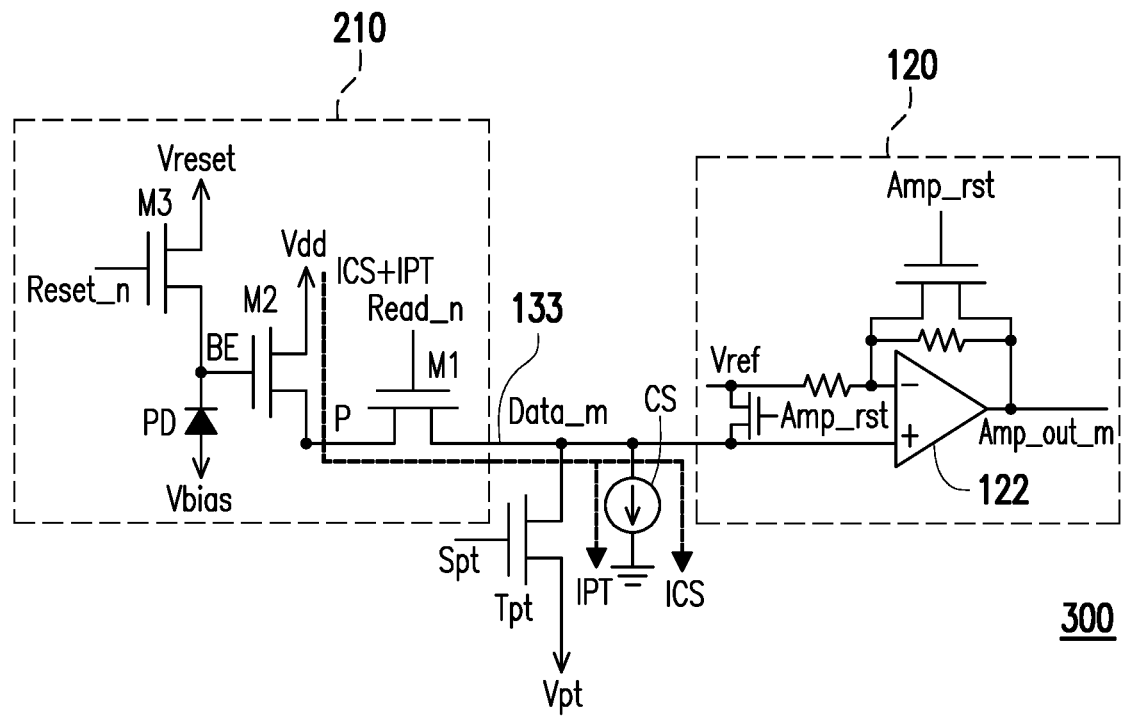
FIG. 3A illustrates a schematic diagram of an electronic device according to an embodiment of the disclosure.

FIG. 3A illustrates a schematic diagram of an electronic device according to an embodiment of the disclosure. Referring to FIG. 3A, the electronic device 300 of the present embodiment is similar to the electronic device 200 of FIG. 2B, and the main difference therebetween, for example, lies in that the electronic device 300 further includes a plurality of pre-trap transistor devices Tpt. The pre-trap transistor devices Tpt are disposed outside of the active area AA, or in the peripheral area PA. In FIG. 3A, only one sensing pixel circuit 210, one amplifier circuit 120, one current source CS, and one pre-trap transistor device are illustrated for example, but the disclosure is not limited thereto.

To be specific, the sensing pixel circuit 210 of the present embodiment includes a photoelectric sensing element PD, a first transistor device M1, a second transistor device M2 and a third transistor device M3. The photoelectric sensing element PD includes a first end (cathode) and a second end (anode). The first end of the photoelectric sensing element PD serves as a node BE, and is coupled to the second transistor device M2 and the third transistor device M3. The second end of the photoelectric sensing element PD is coupled to the bias voltage Vb.

The first transistor device M1 includes a first end, a second end and a control end. The first end of the first transistor device M1 is coupled to the second transistor device M2. The second end of the first transistor device M1 is coupled to the amplifier circuit 120 via the data line 133. The control end of the first transistor device M1 is coupled to a first scan line 231_1 of the scan lines 231. The read signal Read_n is transmitted on the first scan line 231_1 to control the conduction state of the first transistor device M1.

The second transistor device M2 includes a first end, a second end and a control end. The first end of the second transistor device M2 is coupled to a first operation voltage, i.e. the operation voltage Vdd. The second end of the second transistor device M2 is coupled to the first end of the first transistor device M1. The control end of the second transistor device M2 is coupled to the first end of the photoelectric sensing element PD.

The third transistor device M3 includes a first end, a second end and a control end. The first end of the third transistor device M3 is coupled to the reset voltage Vrst. The second end of the third transistor device M3 is coupled to the first end of the photoelectric sensing element PD. The control end of the third transistor device M3 is coupled to the reset line 132.

The pre-trap transistor device Tpt is coupled to the sensing pixel circuit 210, and between the sensing pixel circuit 210 and the amplifier circuit 120. The pre-trap transistor device Tpt includes a first end, a second end and a control end. The first end of the pre-trap transistor device Tpt is coupled to the second end of the first transistor device M1. The second end of the pre-trap transistor device Tpt is coupled to a second operation voltage Vpt. The control end of the pre-trap transistor device Tpt is coupled to a control signal Spt. The second operation voltage Vpt is lower than the first operation voltage Vdd.

Figure 3B:
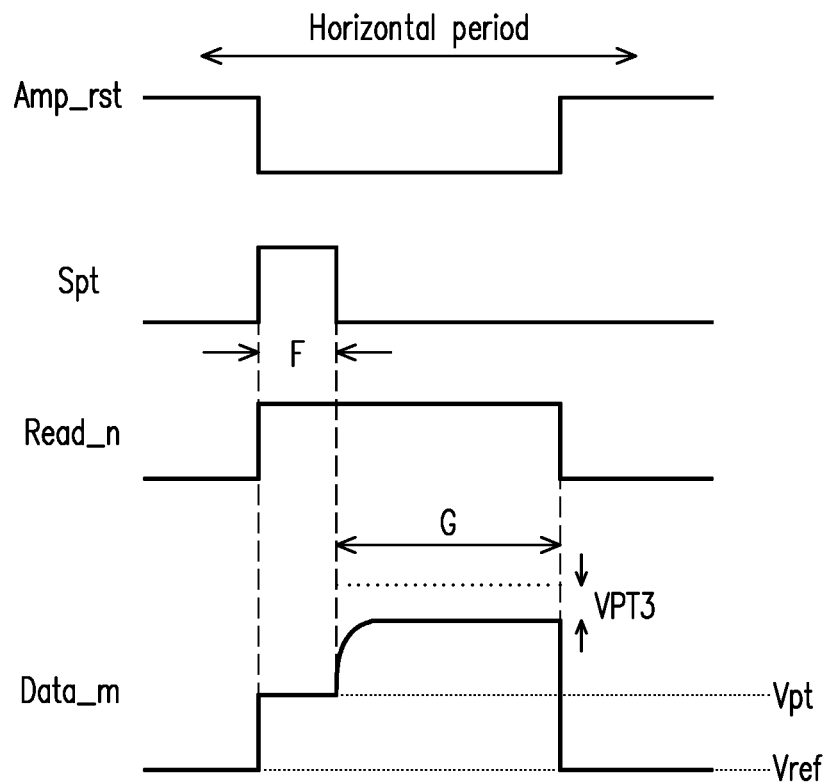
FIG. 3B illustrates a waveform diagram of signals of the electronic device of FIG. 3A according to an embodiment of the disclosure.

FIG. 3B illustrates a waveform diagram of signals of the electronic device of FIG. 3A according to an embodiment of the disclosure. Referring to FIG. 3A and FIG. 3B, the read signal Read_n includes a period F and a period G. The period F and the period G are a continuous period, and the period G is longer than the period F. The read signal Read_n turns on the first transistor device M1 during the period G and the period F. The sensing data Data_m (a data voltage of the data line 133) is at a third level, e.g. the second operation voltage Vpt, during the period F, and the sensing data Data_m is at the second level during the period G. The second level is higher than or equal to the third level Vpt.

In the period F, the first read signal Read_n is at the high level to turn on the first transistor device M1, and the control signal Spt is also at the high level to turn on the pre-trap transistor device Tpt. The period F can be deemed as the pre-trap period. The sensing data Data_m is at a certain level, e.g. the third level Vpt, during the period F. A total current ICS+IPT flows through the second transistor device M2 and the first transistor device M1. Next, the constant current ICS flows to the current source CS, and the transistor current IPT flows to the pre-trap transistor device Tpt. The transitional phenomena of carrier conduction instability in the second transistor device M2 is accelerated by the total current ICS+IPT in the period F, i.e. the pre-trap period.

In the period G, the first read signal Read_n is at the high level to turn on the first transistor device M1. The constant current ICS flows through the second transistor device M2 and the first transistor device M1 from the operation voltage Vdd to the current source CS. The second transistor device M2 acts as a source follower in the transistor saturation region including the phenomena saturated enough in the period G.

Therefore, a voltage difference VPT3 of the sensing data Data_m is a fixed value to occur by the phenomena saturated, and does not change along with the current source CS and time, such that the output variation factor of the sensing pixel circuit 210, non-saturated phenomena on the sensing data Data_m, can be reduced.

Figure 4A:
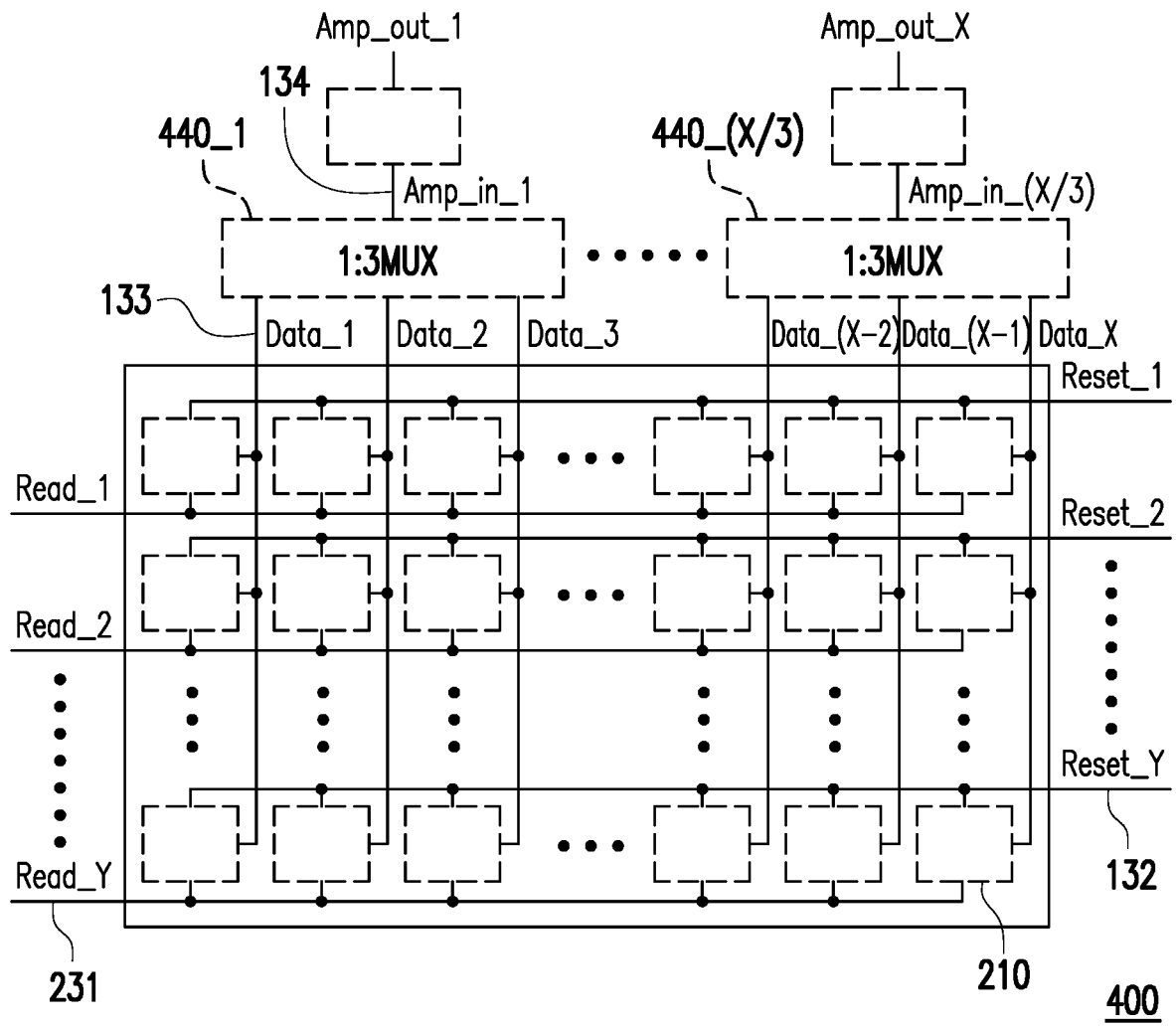
FIG. 4A and FIG. 4B illustrate schematic diagrams of an electronic device according to another embodiment of the disclosure.
Figure 4B:
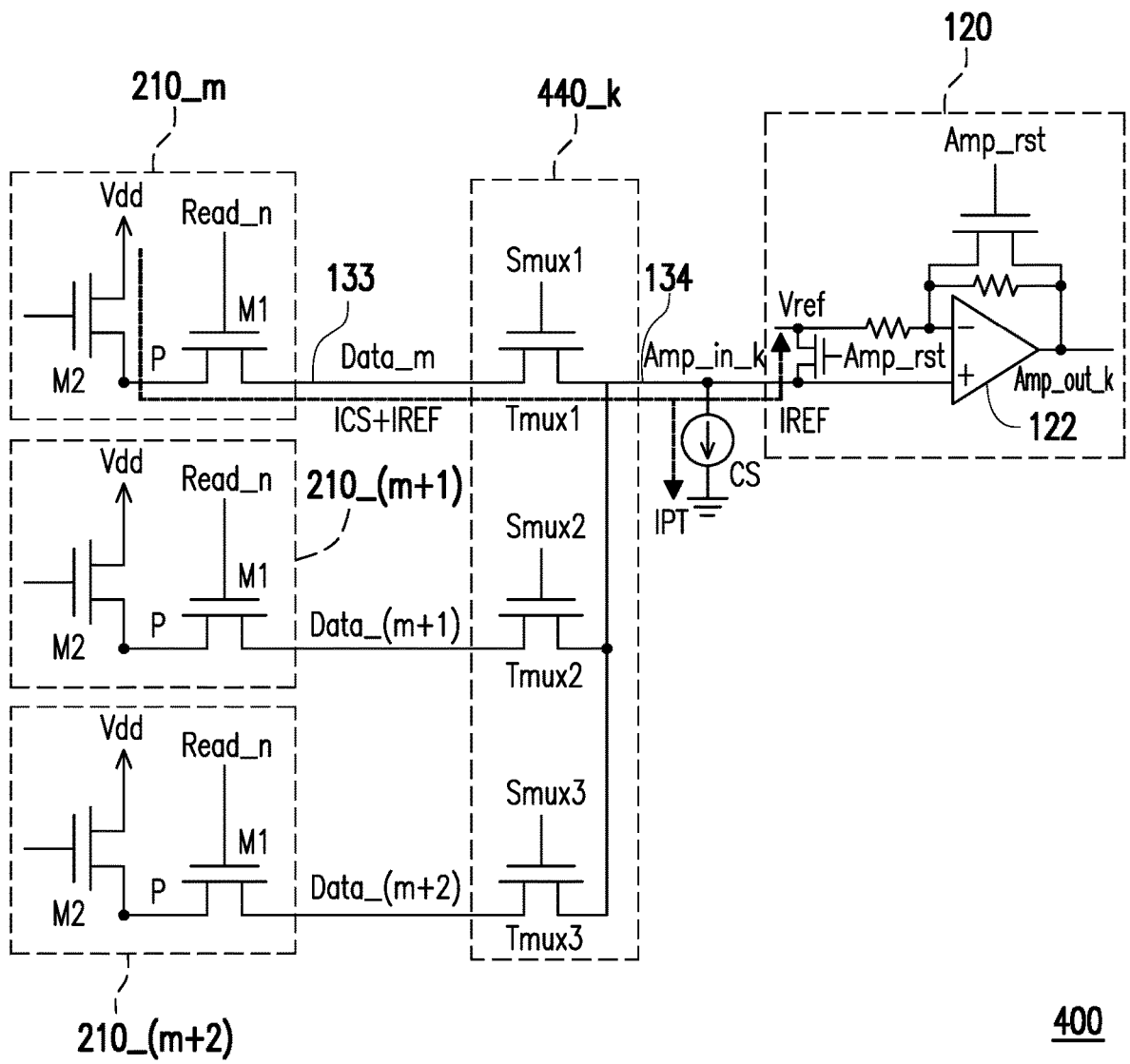

FIG. 4A and FIG. 4B illustrate schematic diagrams of an electronic device according to another embodiment of the disclosure. Referring to FIG. 4A and FIG. 4B, the electronic device 400 of the present embodiment is similar to the electronic device 200 of FIG. 2A and FIG. 2B, and the main difference therebetween, for example, lies in that the electronic device 400 further includes a plurality of multiplexer circuits 440_1 to 440_(X/3), where X is multiples of 3, and larger than or equal to 6. Each output line 134 has a current source CS, and the current source CS is disposed outside of the active area AA to supply a constant current ICS.

To be specific, the multiplexer circuits 440_1 to 440_(X/3) are coupled between the sensing pixel circuits 210 and the amplifier circuits 120. The multiplexer circuits 440_1 to 440_(X/3) are configured to select the sensing data Data_1 and Data_2 to Data_X from the sensing pixel circuits 210 and output the selected sensing data Amp_in_1 to Amp_in_(X/3) to the amplifier circuits 120. For example, each of the multiplexer circuits 440_1 to 440_(X/3) is an 1:3 multiplexer. The multiplexer circuit 440_1 selects the sensing data Data_1, Data_2 and Data_3 and outputs the selected sensing data Amp_in_1 to the corresponding amplifier circuit 120. The multiplexer circuit 440_(X/3) selects the sensing data Data (X−2), Data (X−1) and Data_X and outputs the selected sensing data Amp_in_(X/3) to the corresponding amplifier circuit 120, but the disclosure dose not limited thereto. In some embodiments, each of the multiplexer circuit may be an 1:2 multiplexer, 1:4 multiplexer, 1:5 multiplexer or any suitable multiplexer, that is, the multiplexer circuit may select not only three sensing data from the data line to output, but select the data according to design needs to output.

In FIG. 4B, taking a set of sensing pixel circuits 210_m, 210_(m+1) and 210_(m+2) for example, the sensing pixel circuits 210_m, 210_(m+1) and 210_(m+2) are coupled to the amplifier circuit 120 via the multiplexer circuit 440_k. The multiplexer circuit 440_k is controlled by control signals Smux1, Smux2 and Smux3. The multiplexer circuit 440_k selects the sensing data Data_m, Data_(m+1) and Data (m+2) and outputs the selected sensing data Amp_in_k to the amplifier circuit 120.

Figure 4C:
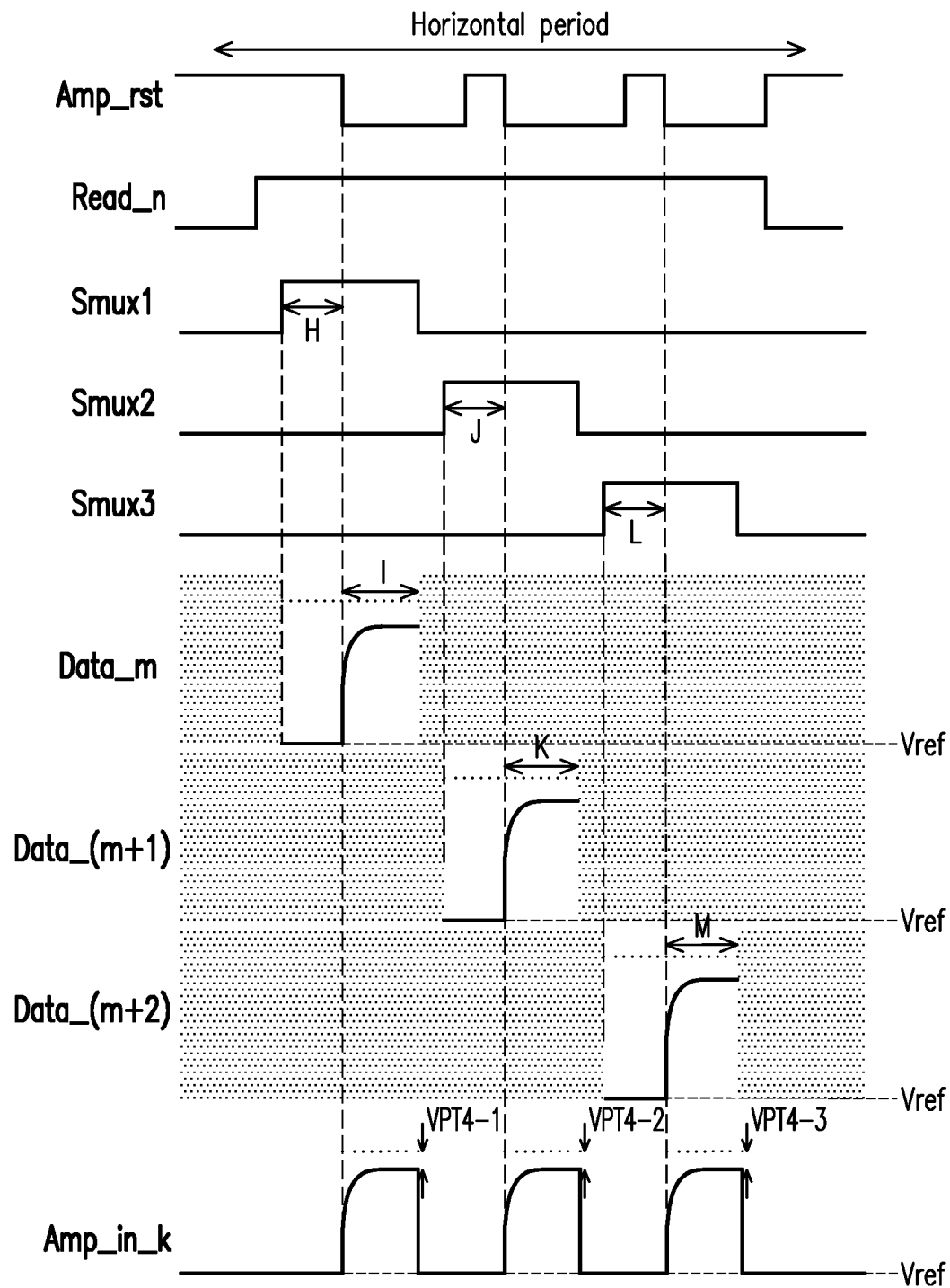
FIG. 4C illustrates a waveform diagram of signals of the electronic device of FIG. 4B according to an embodiment of the disclosure.

FIG. 4C illustrates a waveform diagram of signals of the electronic device of FIG. 4B according to an embodiment of the disclosure. Referring to FIG. 4B and FIG. 4C, in the periods H, J and L, the first read signal Read_n is at the high level to turn on the first transistor device M1, and the control signal Amp_rst is also at the high level to turn on the transistor devices of the amplifier circuit 120. In addition, transistor devices Tmux1, Tmux2 and Tmux3 of the multiplexer circuit 440_k are respectively turned on in the periods H, J and L. The periods H, J and L are similar to the first period D and can be deemed as the pre-trap periods.

Taking the period H for example, the sensing data Data_m is at the low level, e.g. the first level Vref. A total current ICS+IREF flows through the second transistor device M2 and the first transistor device M1. Next, the constant current ICS flows to the current source CS, and the reference current IREF flows to the amplifier circuit 120. The transitional phenomena of carrier conduction instability in the second transistor device M2 is accelerated by the total current ICS+IREF in the period H. The operation of the electronic device 400 during the periods J and L is similar to the operation of the electronic device 400 during the period H, and the description thereof is not repeated again herein.

In the periods I, K and M, the first read signal Read_n is at the high level to turn on the first transistor device M1, and the transistor devices Tmux1, Tmux2 and Tmux3 are respectively turned on in the periods I, K and M.

Taking the period I for example, the constant current ICS flows through the second transistor device M2 and the first transistor device M1 from the operation voltage Vdd to the current source CS. The second transistor device M2 acts as a source follower in the transistor saturation region including the phenomena saturated enough in the period I. The operation of the electronic device 400 during the periods K and M is similar to the operation of the electronic device 400 during the period I, and the description thereof is not repeated again herein.

Therefore, the voltage difference VPT4-1, VPT4-2, VPT4-3 of the sensing data Amp_in_k is a fixed value to occur by the phenomena saturated, and does not change along with the current source CS and time, such that the output variation factor of the sensing pixel circuit 210, non-saturated phenomena on the sensing data Amp_in_k, can be reduced.

Figure 5A:
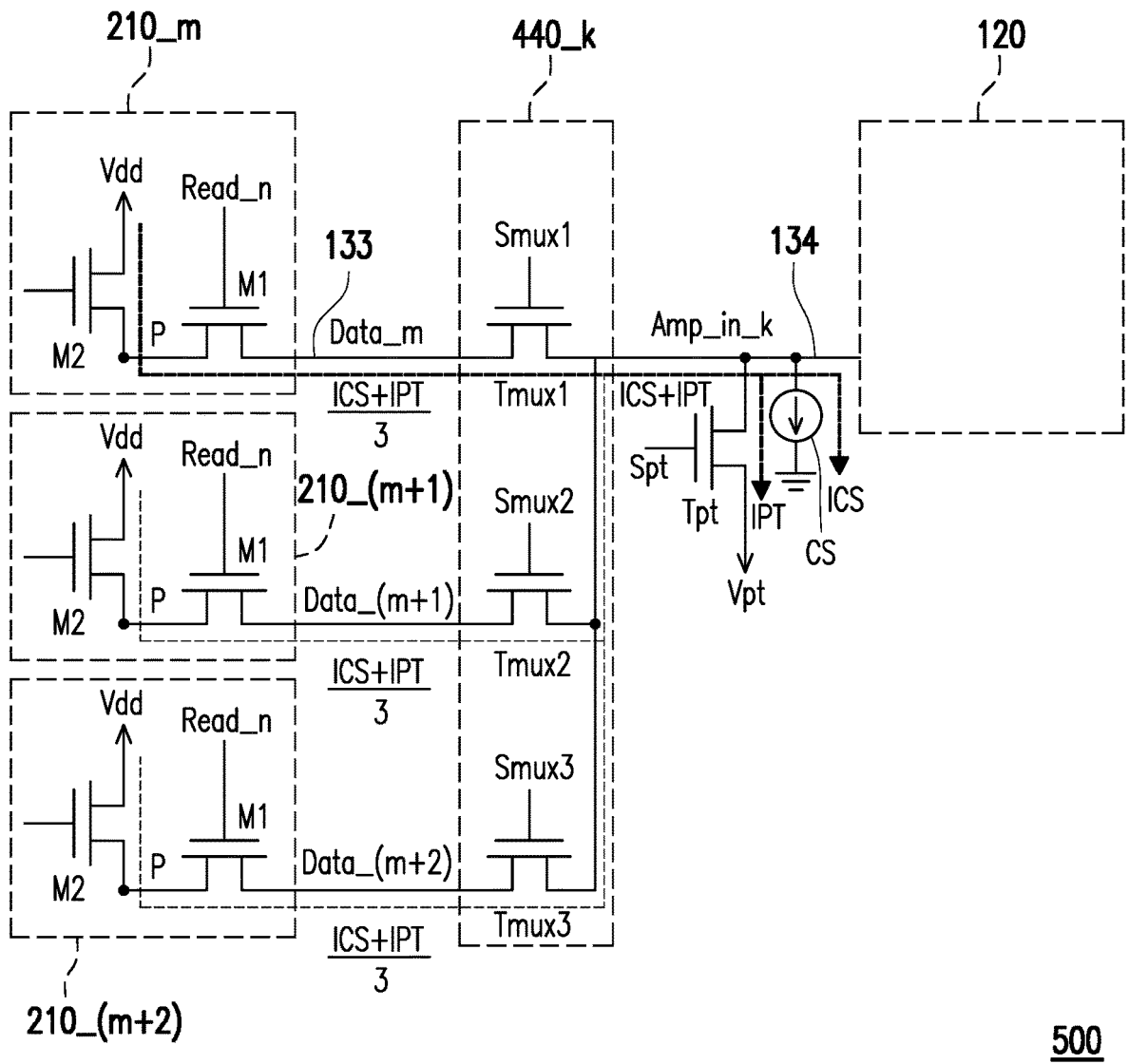
FIG. 5A illustrates a schematic diagrams of an electronic device according to another embodiment of the disclosure.

FIG. 5A illustrates a schematic diagrams of an electronic device according to another embodiment of the disclosure. Referring to FIG. 5A, the electronic device 500 of the present embodiment is similar to the electronic device 400 of FIG. 4A and FIG. 4B, and the main difference therebetween, for example, lies in that the electronic device 500 further includes a pre-trap transistor device Tpt. Each output line 134 has the current source CS and the pre-trap transistor device Tpt disposed outside of the active area AA.

Figure 5B:
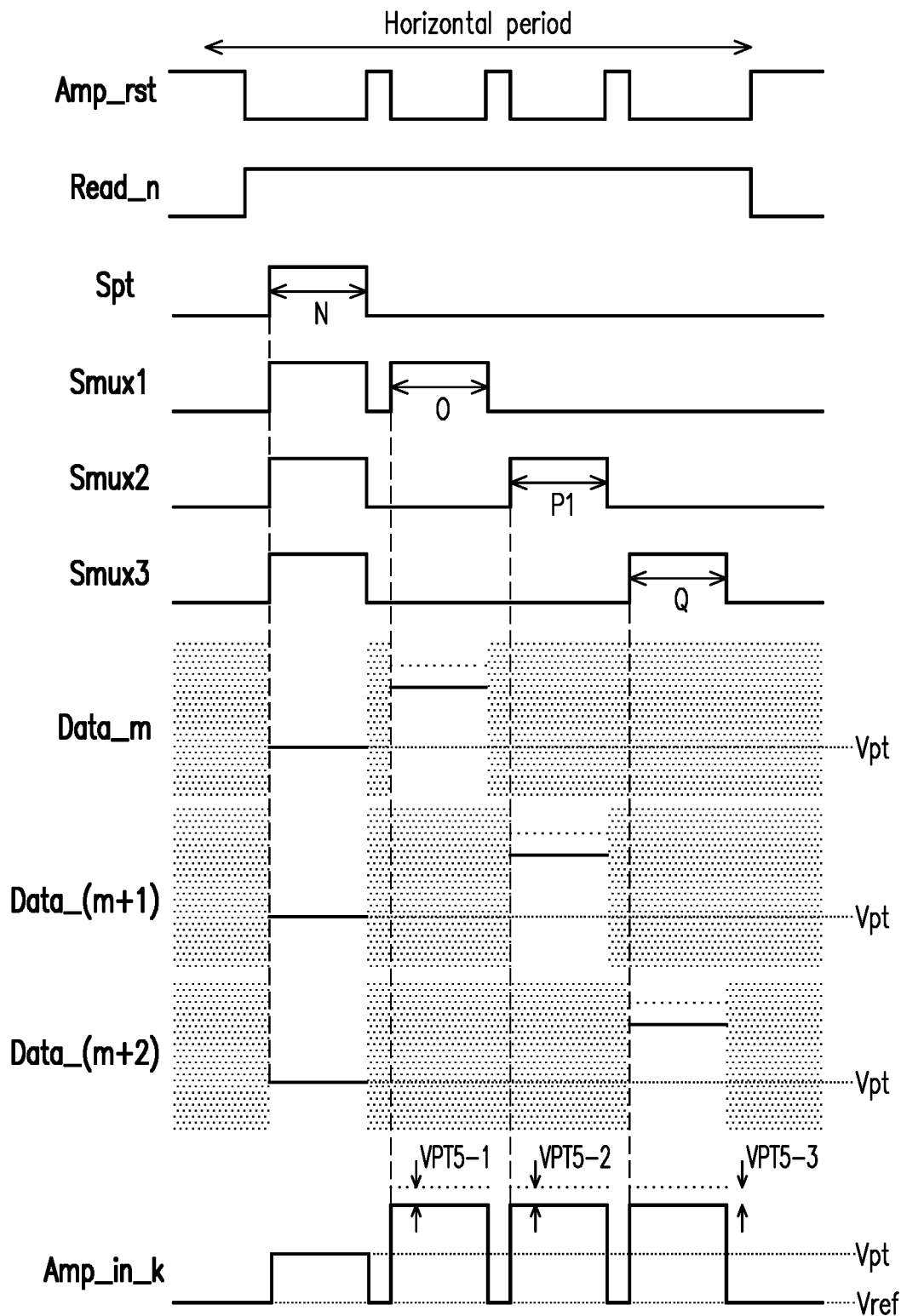
FIG. 5B illustrates a waveform diagram of signals of the electronic device of FIG. 5A according to another embodiment of the disclosure.

FIG. 5B illustrates a waveform diagram of signals of the electronic device of FIG. 5A according to another embodiment of the disclosure. Referring to FIG. 5A and FIG. 5B, in the period N, the first read signal Read_n is at the high level to turn on the first transistor device M1, and the control signal Spt is also at the high level to turn on the pre-trap transistor device Tpt. In addition, transistor devices Tmux1, Tmux2 and Tmux3 of the multiplexer circuit 440_k are all turned on in the period N. The period N is similar to the period F and can be deemed as the pre-trap period. The sensing data Data_m, Data_(m+1) and Data (m+2) and the sensing data Amp_in_k are at a certain level, e.g. the third level Vpt, during the period N. A current (ICS+IPT)/3 flows through the second transistor device M2 and the first transistor device M1 in each of the sensing pixel circuits 210_m, 210_(m+1) and 210_(m+2). Next, the constant current ICS flows to the current source CS, and the transistor current IPT flows to the pre-trap transistor device Tpt. The transitional phenomena of carrier conduction instability in the second transistor device M2 of each of the sensing pixel circuits 210_m, 210_(m+1) and 210_(m+2) is accelerated by the current (ICS+IPT)/3 in the period N, i.e. the pre-trap period.

In the periods O, P1 and Q, the first read signal Read_n is at the high level to turn on the first transistor device M1, and the transistor devices Tmux1, Tmux2 and Tmux3 are respectively turned on in the periods O, P1 and Q. The constant current ICS flows through the second transistor device M2 and the first transistor device M1 of each of the sensing pixel circuits 210_m, 210_(m+1) and 210_(m+2) from the operation voltage Vdd to the current source CS. The second transistor device M2 acts as a source follower in the transistor saturation region including the phenomena saturated enough in the period N.

Therefore, a voltage difference VPT5-1, VPT5-2, VPT5-3 of the sensing data Amp_in_k is a fixed value to occur by the phenomena saturated, and does not change along with the current source CS and time, such that the output variation factor of the sensing pixel circuit 210, non-saturated phenomena on the sensing data Amp_in_k, can be reduced.

Figure 6A:
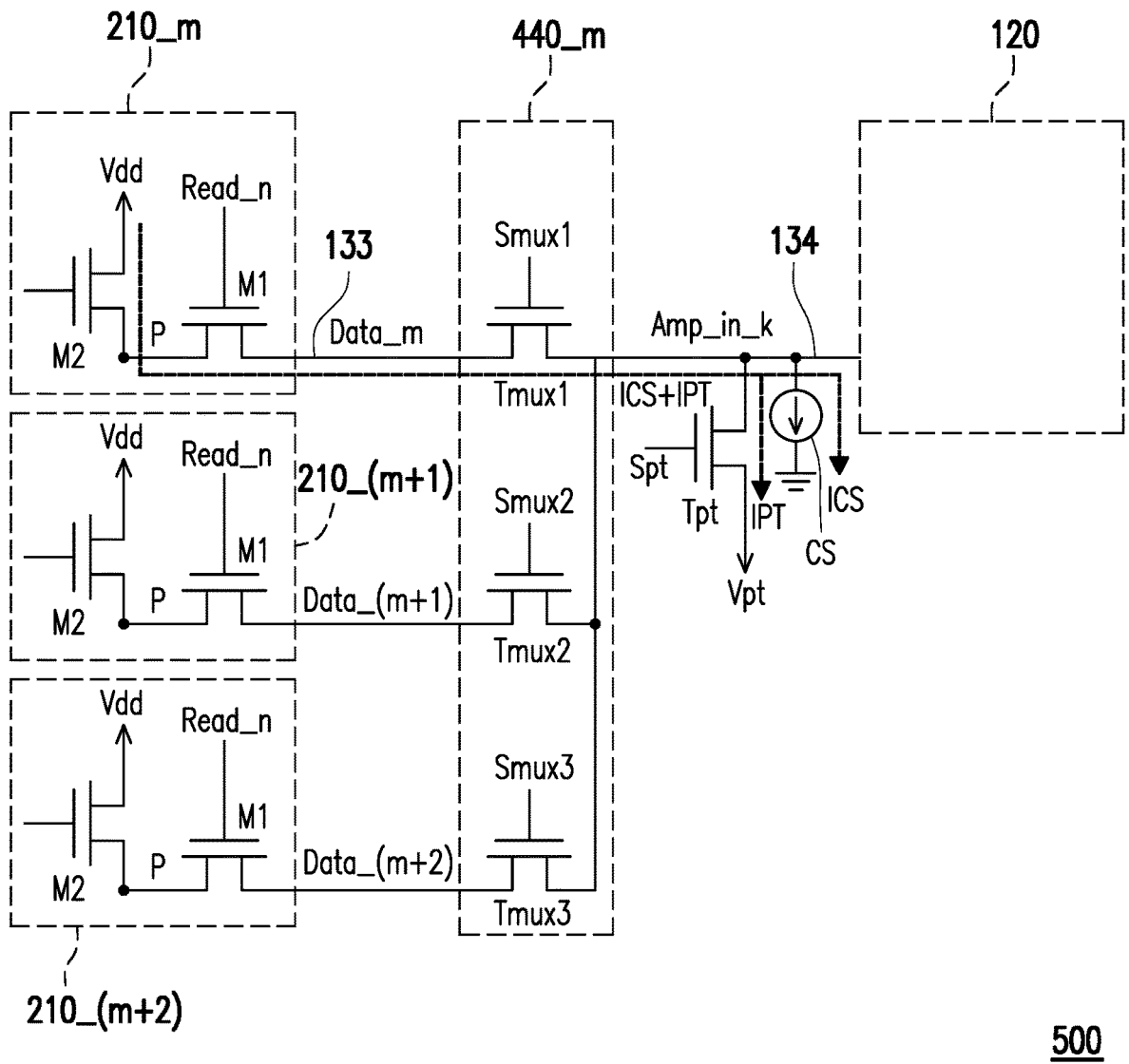
FIG. 6A illustrates a schematic diagrams of an electronic device according to another embodiment of the disclosure.
Figure 6B:
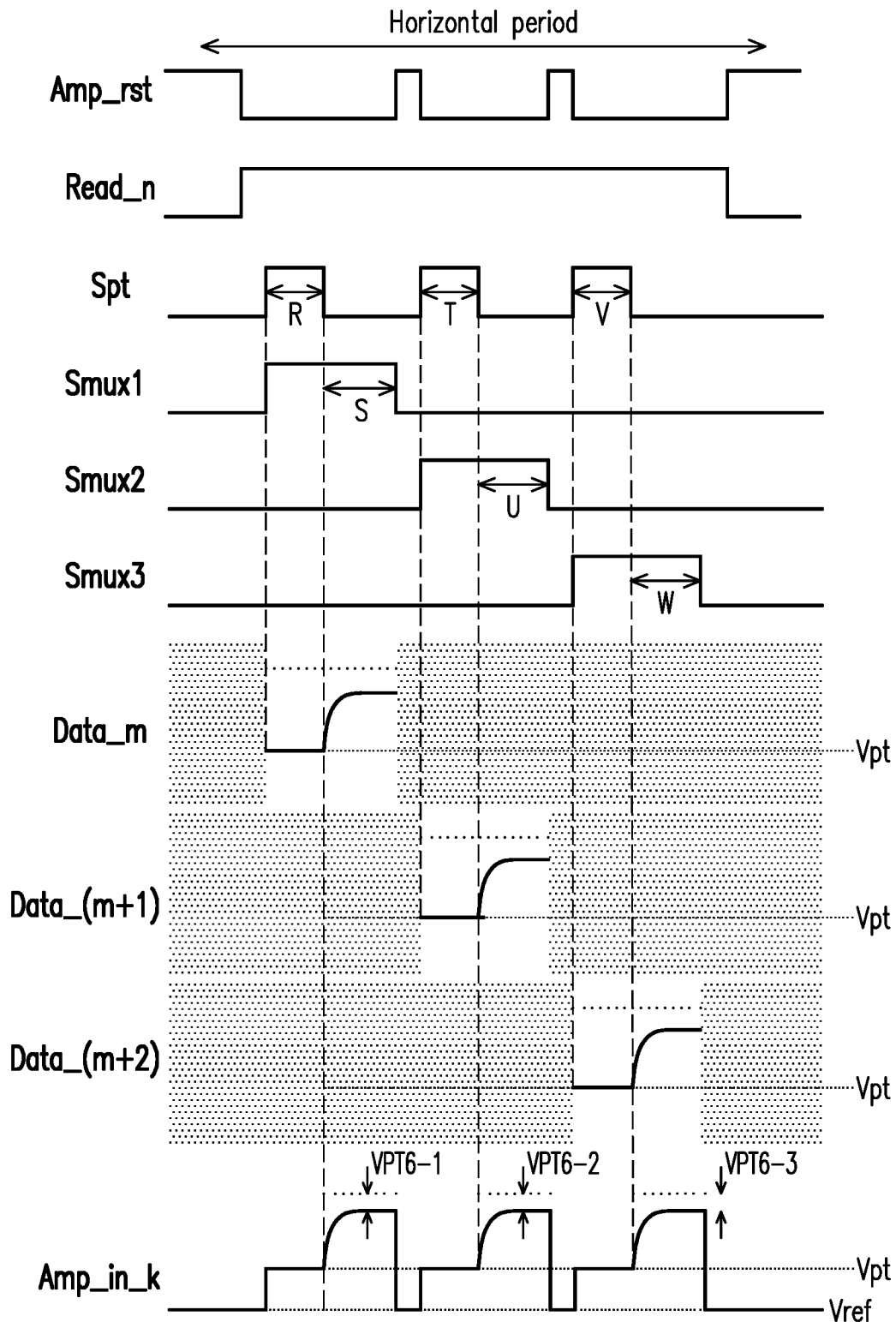
FIG. 6B illustrates a waveform diagram of signals of the electronic device of FIG. 6A according to another embodiment of the disclosure.

FIG. 6A illustrates a schematic diagrams of an electronic device according to another embodiment of the disclosure. FIG. 6B illustrates a waveform diagram of signals of the electronic device of FIG. 6A according to another embodiment of the disclosure. Referring to FIG. 6A and FIG. 6B, the circuit structure of the electronic device 500 of the present embodiment the same as the electronic device 500 of FIG. 5A, but the operations are different.

In FIG. 6B, the pre-trap periods R, T and V are located before periods S, U and W, respectively. During the pre-trap period R, T and V, the total current ICS+IPT flows through the second transistor device M2 and the first transistor device M1. Next, the constant current ICS flows to the current source CS, and the transistor current IPT flows to the pre-trap transistor device Tpt. The transitional phenomena of carrier conduction instability in the second transistor devices M2 of the sensing pixel circuits 210_m, 210_(m+1) and 210_(m+2) is accelerated by the total current ICS+IPT in the pre-trap periods R, T and V.

Therefore, the voltage difference VPT6-1, VTP6-2, VTP6-3 of the sensing data Amp_in_k is a fixed value to occur by the phenomena saturated, and does not change along with the current source CS and time, such that the output variation factor of the sensing pixel circuit 210, non-saturated phenomena on the sensing data Amp_in_k, can be reduced.

Figure 7A:
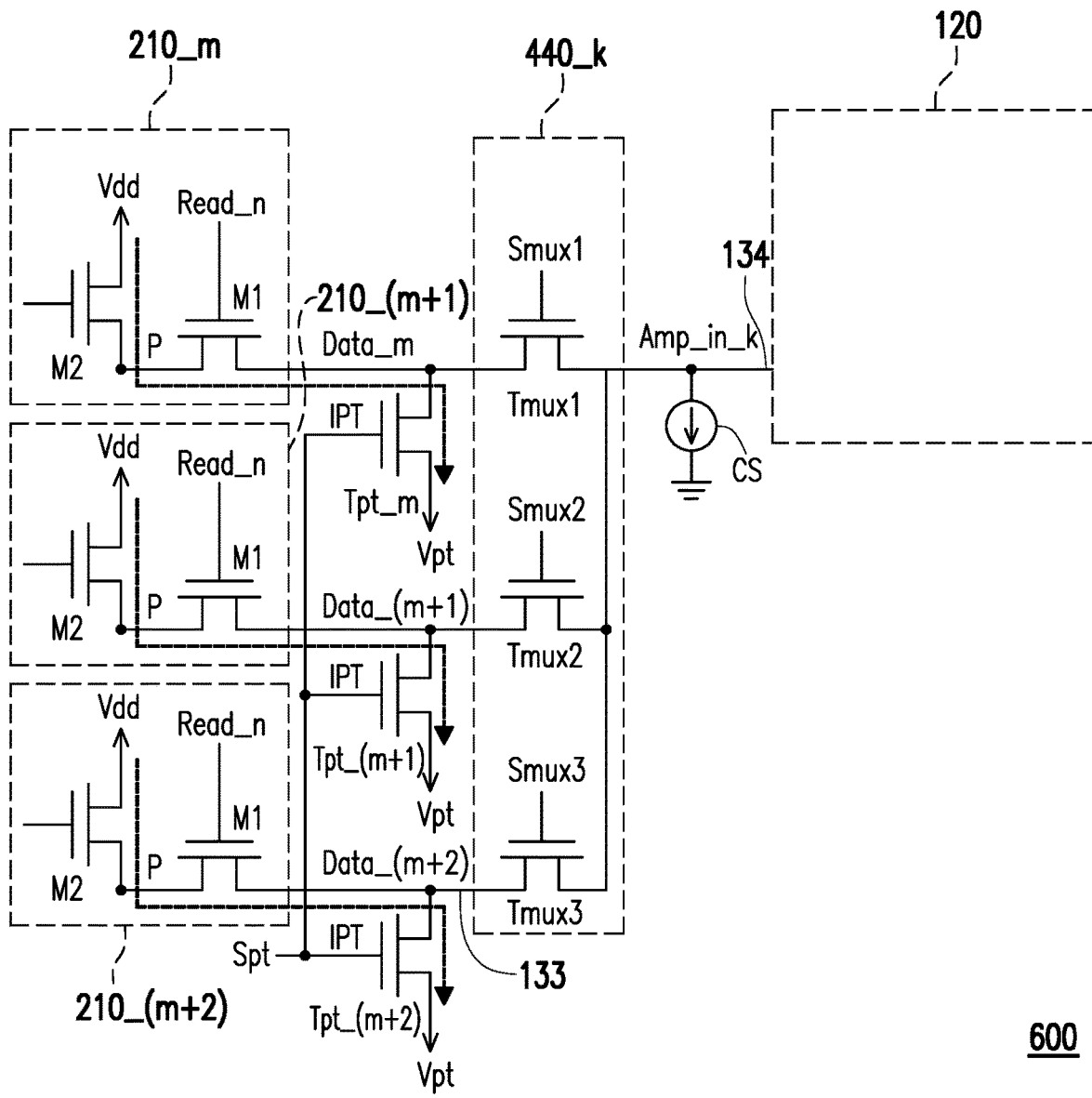
FIG. 7A illustrates a schematic diagrams of an electronic device according to another embodiment of the disclosure.
Figure 7B:
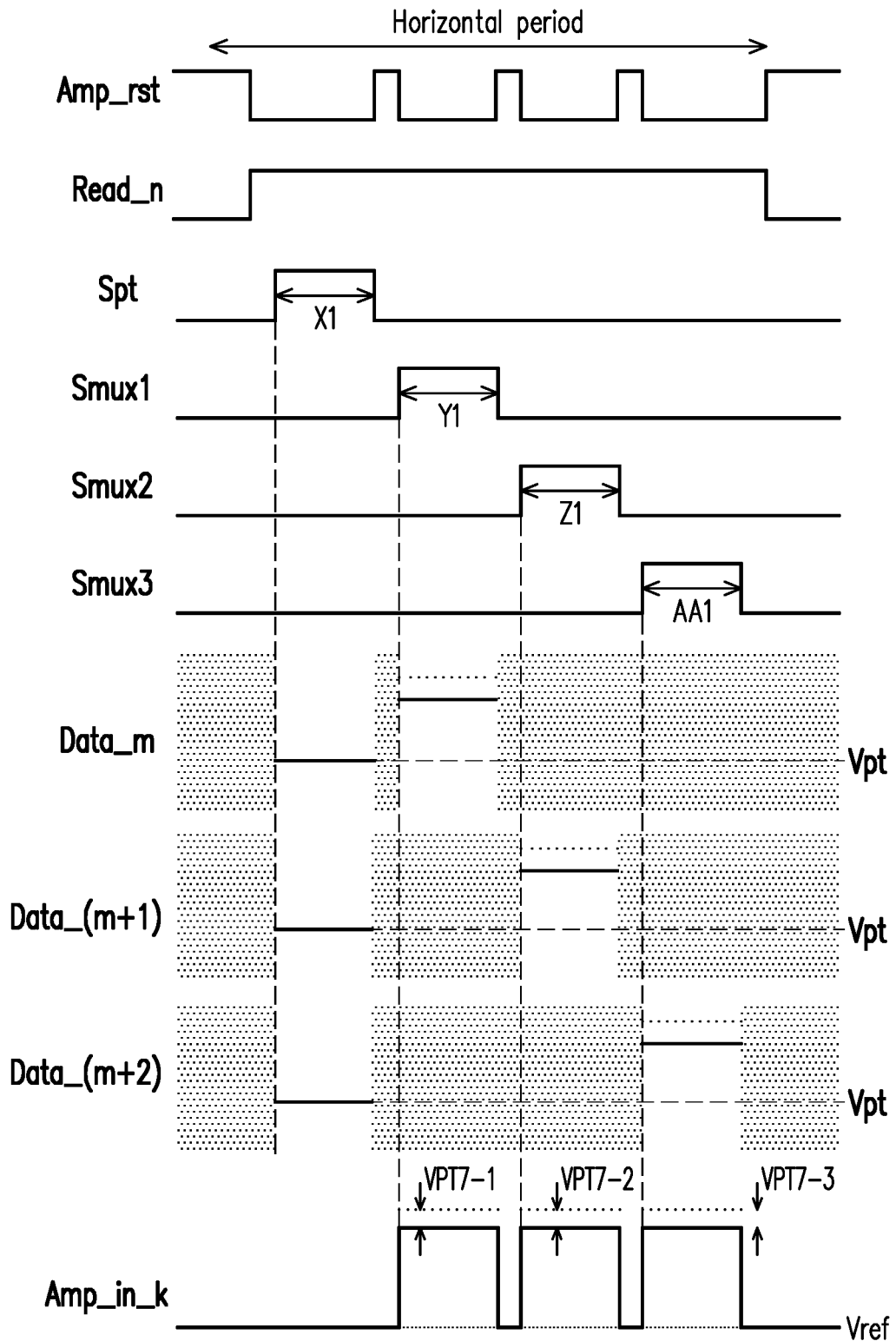
FIG. 7B illustrates a waveform diagram of signals of the electronic device of FIG. 7A according to another embodiment of the disclosure.

FIG. 7A illustrates a schematic diagrams of an electronic device according to another embodiment of the disclosure. FIG. 7B illustrates a waveform diagram of signals of the electronic device of FIG. 7A according to another embodiment of the disclosure. Referring to FIG. 7A and FIG. 7B, the electronic device 600 of the present embodiment is similar to the electronic device 500 of FIG. 5A, and the main difference therebetween, for example, lies in that each data line 133 has the pre-trap transistor device, e.g. pre-trap transistor devices Tpt_m, Tpt_(m+1) and Tpt_(m+2), and the pre-trap transistor devices Tpt_m, Tpt_(m+1) and Tpt_(m+2) are controlled by the same control signal Spt.

In the period X1, the first read signal Read_n is at the high level to turn on the first transistor device M1, and the control signal Spt is also at the high level to turn on the pre-trap transistor devices Tpt_m, Tpt_(m+1) and Tpt_(m+2). The period X1 can be deemed as the pre-trap period. The sensing data Data_m, Data_(m+1) and Data (m+2) and the sensing data Amp_in_k are at a certain level, e.g. the third level Vpt, during the period X1. The current IPT flows through the second transistor device M2, the first transistor device M1 in each of the sensing pixel circuits 210_m, 210_(m+1) and 210_(m+2) and the respective pre-trap transistor device. The transitional phenomena of carrier conduction instability in the second transistor device M2 of each of the sensing pixel circuits 210_m, 210_(m+1) and 210_(m+2) is accelerated by the current IPT in the period X1, i.e. the pre-trap period.

In the periods Y1, Z1 and AA1, the first read signal Read_n is at the high level to turn on the first transistor device M1, and the transistor devices Tmux1, Tmux2 and Tmux3 are respectively turned on in the periods Y1, Z1 and AA1. The constant current ICS flows through the second transistor device M2 and the first transistor device M1 of each of the sensing pixel circuits 210_m, 210_(m+1) and 210_(m+2) from the operation voltage Vdd to the current source CS. The second transistor device M2 acts as a source follower in the transistor saturation region including the phenomena saturated enough in the period X1.

Therefore, the voltage difference VPT7-1, VPT7-2, VPT7-3 of the sensing data Amp_in_k is a fixed value to occur by the phenomena saturated, and does not change along with the current source CS and time, such that the output variation factor of the sensing pixel circuit 210, non-saturated phenomena on the sensing data Amp_in_k, can be reduced.

Figure 8A:
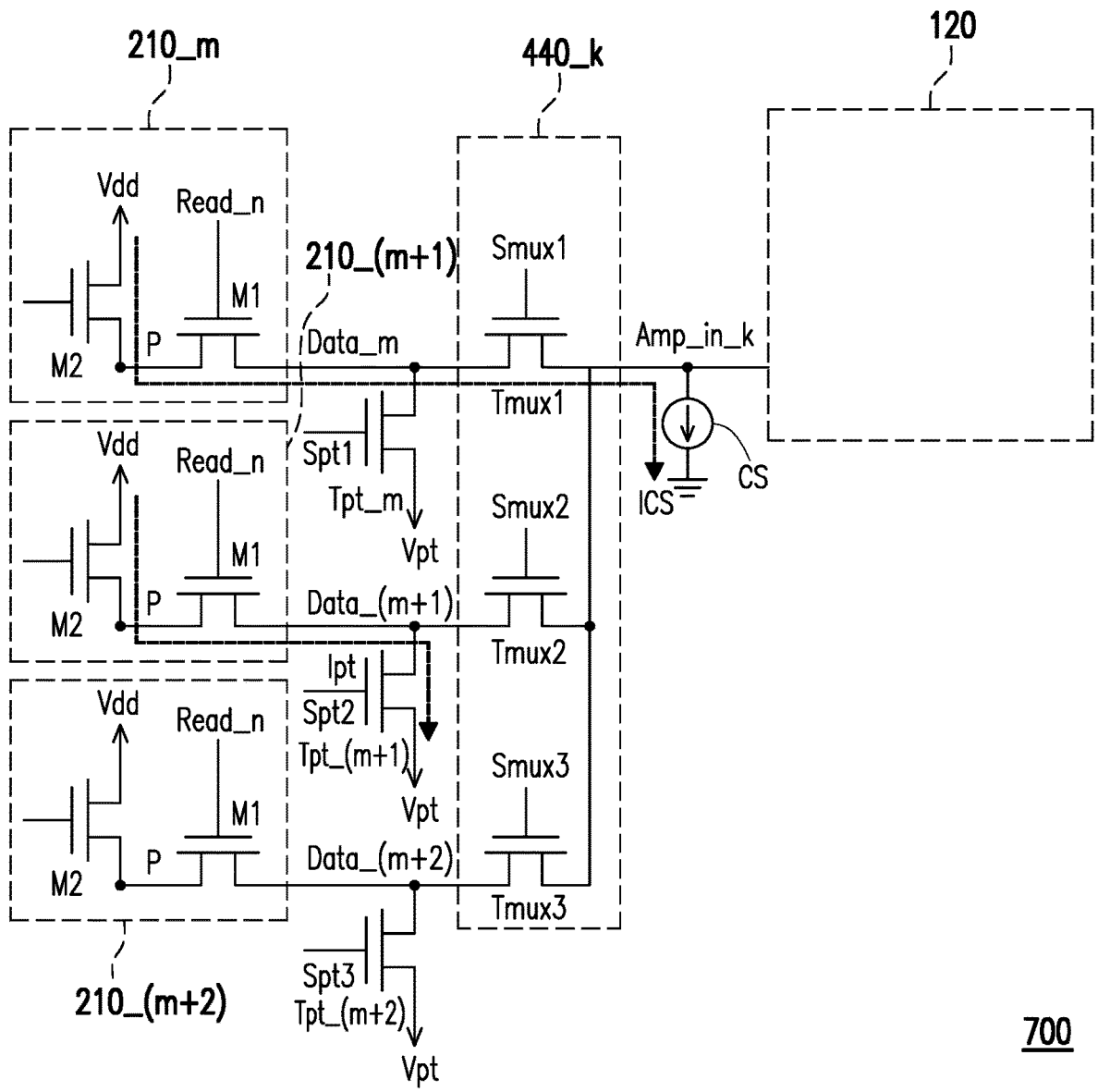
FIG. 8A illustrates a schematic diagrams of an electronic device according to another embodiment of the disclosure.
Figure 8B:
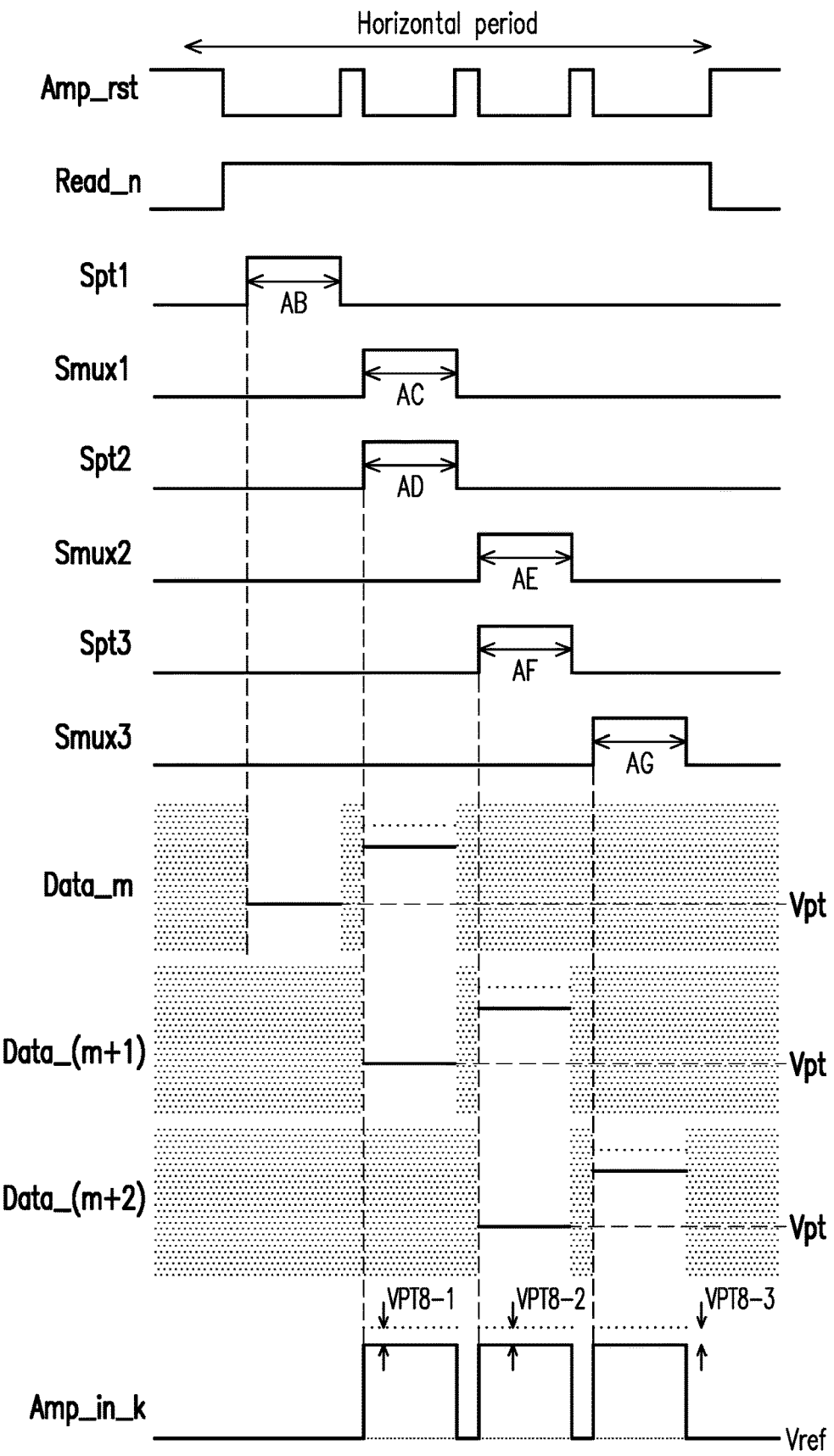
FIG. 8B illustrates a waveform diagram of signals of the electronic device of FIG. 8A according to another embodiment of the disclosure.

FIG. 8A illustrates a schematic diagrams of an electronic device according to another embodiment of the disclosure. FIG. 8B illustrates a waveform diagram of signals of the electronic device of FIG. 8A according to another embodiment of the disclosure. Referring to FIG. 8A and FIG. 8B, the electronic device 700 of the present embodiment is similar to the electronic device 600 of FIG. 7A, and the main difference therebetween, for example, lies in that the pre-trap transistor devices Tpt_m, Tpt_(m+1) and Tpt_(m+2) are respectively controlled by different control signals Spt1, Spt2 and Spt3.

In the periods AB, AD and AF, the first read signal Read_n is at the high level to turn on the first transistor device M1, and the control signals Spt1, Spt2 and Spt3 are at the high level to turn on the pre-trap transistor devices Tpt_m, Tpt_(m+1) and Tpt_(m+2) in the periods AB, AD and AF, respectively. In addition, the transistor devices Tmux1, Tmux2 and Tmux3 of the multiplexer circuit 440_k are turned on in the periods AC, AE and AG, respectively. The periods AB, AD and AF can be deemed as the pre-trap periods. The sensing data Data_m, Data (m+1) and Data (m+2) are at a certain level, e.g. the third level Vpt, during the periods AB, AD and AF.

Taking the periods AB and AC for example, the period AB serves as the pre-trap period and is before the period AC. The current IPT flows through the second transistor device M2 and the first transistor device M1 in the sensing pixel circuit 210_m and the pre-trap transistor device Tpt_m in the period AB. The transitional phenomena of carrier conduction instability in the second transistor device M2 of the sensing pixel circuit 210_m is accelerated by the current IPT in the period AB, i.e. the pre-trap period. Next, in the period AC, the first read signal Read_n is at the high level to turn on the first transistor device M1, and the transistor device Tmux1 is turned on in the period AC. The constant current ICS flows through the second transistor device M2 and the first transistor device M1 of the sensing pixel circuit 210_m from the operation voltage Vdd to the current source CS, as illustrated in FIG. 8A. The second transistor device M2 acts as a source follower in the transistor saturation region including the phenomena saturated enough in the period AB.

In the period AD, the current IPT flows through the second transistor device M2 and the first transistor device M1 in the sensing pixel circuit 210_(m+1) and the pre-trap transistor device Tpt_(m+1). The transitional phenomena of carrier conduction instability in the second transistor device M2 of the sensing pixel circuit 210_(m+1) is accelerated by the current IPT in the period AD, i.e. the pre-trap period. The operation of the electronic device 700 during the periods AE, AF and AG is similar to the operation of the electronic device 700 during the period AB, AC and AD, and the description thereof is not repeated again herein. In some embodiments, the period AD does not need to be simultaneous with the period AC. The period AE does not need to be simultaneous with the period AF. In some embodiments, the control signal Smux1 may be used in common with the control signal Spt2 to reduce the number of signal line.

Therefore, the voltage difference VPT8-1, VPT8-2, VPT8-3 of the sensing data Amp_in_k is a fixed value to occur by the phenomena saturated, and does not change along with the current source CS and time, such that the output variation factor of the sensing pixel circuit 210, non-saturated phenomena on the sensing data Amp_in_k, can be reduced.

In summary, in the embodiments of the disclosure, the transitional phenomena of carrier conduction instability in the second transistor device is accelerated by the specified current in the pre-trap period, and is close to saturation in advance. The drain current of the second transistor device is controlled to flow just before readout. Therefore, the output variation factor of the sensing pixel circuit can be reduced, and thus the output performance of the sensing pixel circuit can be stabilized, and the noise can be lowered.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
   a plurality of sensing pixel circuits, wherein at least one of the sensing pixel circuits comprises:
   a photoelectric sensing element, comprising a first end and a second end, wherein the second end of the photoelectric sensing element is coupled to a bias voltage;
   a first transistor device, comprising a first end, a second end and a control end, wherein the control end of the first transistor device is coupled to a first scan line;
   a second transistor device, comprising a first end, a second end and a control end, wherein the first end of the second transistor device is coupled to a first operation voltage, the second end of the second transistor device is coupled to the first end of the first transistor device, and the control end of the second transistor device is coupled to the first end of the photoelectric sensing element; and
   a third transistor device, comprising a first end, a second end and a control end, wherein the first end of the third transistor device is coupled to a reset voltage, the second end of the third transistor device is coupled to the first end of the photoelectric sensing element, and the control end of the third transistor device is coupled to a reset line; and
   a plurality of pre-trap transistor devices, wherein at least one of the pre-trap transistor devices is coupled to the at least one sensing pixel circuit, and comprises a first end, a second end and a control end, wherein the first end of the pre-trap transistor device is coupled to the second end of the first transistor device, the second end of the pre-trap transistor device is coupled to a second operation voltage, and the control end of the pre-trap transistor device is coupled to a control signal, wherein in a pre-trap period, a first current flows to a current source, the second current flows to the at least one of the pre-trap transistor, and a third current flows through the second transistor device and the first transistor device.

2. The electronic device of claim 1, further comprising:
   a plurality of amplifier circuit, wherein at least one of the amplifier circuits is coupled to the second end of the first transistor device, and comprises:

an amplifier, comprising a first input end and a second input end, wherein the first input end of the amplifier receives a sensing data, and the second input end of the amplifier receives a reference signal.

3. The electronic device of claim 2, further comprising:
a plurality of multiplexer circuits, wherein at least one of the multiplexer circuit is coupled between the at least one sensing pixel circuit and the at least one amplifier circuit, and configured to select sensing data from the sensing pixel circuits and output the selected sensing data to the at least one amplifier circuit.

4. The electronic device of claim 2, wherein the pre-trap transistor device is coupled between the at least one sensing pixel circuit and the at least one amplifier circuit.

5. The electronic device of claim 2, further comprising:
a plurality of current sources, wherein at least one of the current sources is coupled to the at least one amplifier circuit and the at least one sensing pixel circuit.

6. The electronic device of claim 5, wherein the electronic device has a peripheral area, the amplifier circuits and the current sources are disposed in the peripheral area.

7. The electronic device of claim 1, wherein the third current is a sum of the first current and the second current.

* * * * *